United States Patent [19]

Gadeken et al.

[11] Patent Number: 4,857,729

[45] Date of Patent: Aug. 15, 1989

[54] METHOD OF RADIOACTIVE WELL LOGGING

[75] Inventors: Larry L. Gadeken; Harry D. Smith, Jr., both of Houston, Tex.

[73] Assignee: Halliburton Logging Services, Inc., Houston, Tex.

[21] Appl. No.: 184,742

[22] Filed: Apr. 22, 1988

[51] Int. Cl.$^4$ .............................................. G01V 5/04
[52] U.S. Cl. ...................................... 250/260; 250/256
[58] Field of Search ........................ 250/260, 259, 256

[56] References Cited

U.S. PATENT DOCUMENTS

| | | | |
|---|---|---|---|
| 3,424,903 | 1/1969 | Lawson | 250/260 |
| 3,739,171 | 6/1973 | Scott | 250/270 |
| 4,415,805 | 11/1983 | Fertl et al. | 250/260 |
| 4,459,479 | 7/1984 | Smith, Jr. et al. | 250/256 |
| 4,493,999 | 1/1985 | Catchen | 250/260 |
| 4,585,939 | 4/1986 | Arnold et al. | 250/256 |
| 4,691,102 | 9/1987 | Schultz et al. | 250/256 |
| 4,717,825 | 1/1988 | Smith, Jr. et al. | 250/256 |

*Primary Examiner*—Constantine Hannaher
*Attorney, Agent, or Firm*—William J. Beard

[57] ABSTRACT

A method of radioactive well logging for use in well operations wherein hydraulic fracturing material, including radioactive isotopes, is injected from a steel-cased well bore 31 into surrounding earth formations 33. Low energy gamma ray emitting radioisotopes are selected for tagging the liquids phase of the fracturing material and high energy gamma ray emitting radioisotopes are selected for tagging the solids phase. The relative amount of low energy radioisotope material inside the well bore 31 relative to the amount outside the casing 35 is determined to minimize the interfering effects of borehole tracers in determining concentrations of the high energy tracers in the formations. The procedure includes detecting the intensity of gamma radiation from the tracers in the borehole and surrounding formations by a detector 38 in the borehole in proximity to the injection zones and obtaining data representative of the radiation intensity. The intensity data is then separated into an observed energy spectrum from which is obtained observed energy spectrum count rates of gamma radiation in an energy region associated with gamma radiation emitted by the low energy tracer material in at least two relatively low energy ranges, a first P of which is highly sensitive to photoelectric attenuation by iron in the well casing and a second M of which is a higher energy range primarily sensitive to Compton scattered gamma rays and much less sensitive to photoelectric absorption by iron.

These count rates are then combined to obtain an observed photoelectric ratio, $R_p = (M/P)$, of the low energy tracer. Count rates of radiation are then obtained in all the energy ranges associated with gamma radiation emitted by the low energy tracer to obtain the total elemental concentration of the low energy tracer in the borehole and the formations. The amount of the low energy tracer in the borehole Tr(Bor) relative to the amount of said low energy tracer outside the casing is determined by a relation involving the observed photoelectric ratio Ph Tr(Obs) of low energy tracer, the total observed concentration of the low energy tracer Tr(Tot), and the low energy photoelectric ratios, Ph Tr(Bor) and Ph Tr(For), calibrated for the tracer in the borehole and in the formation, respectively.

7 Claims, 3 Drawing Sheets

METHOD OF RADIOACTIVE WELL LOGGING

FIELD OF THE INVENTION

This invention relates to radioactivity logging of a well bore using gamma ray spectroscopy analysis and the optimal use of radioactive isotopes in well operations involving multiple radioactive isotopes, and more particularly, to a method for removing the interfering effects of borehole tracers in determining the elemental concentrations of radioactive tracers which have been hydraulically injected into earth formations from a steel-cased well bore which contains a borehole fluid.

BACKGROUND OF THE INVENTION

Radioactive tracers have been used in the petroleum industry to monitor the effectiveness of efforts to fracture earth formations and to cement casings in place in a well bore. Most often a single radioactive tracer is used and its distribution surveyed with a gross gamma ray counting instrument. However, there are many instances, such as in fracturing operations involving the fracturing of multiple zones or the injection of fracturing fluids in several stages, where it is desirable to use two or more tracers. To obtain more and better monitoring information, a different isotope could be used for each stage of the operation, for each zone, or for tagging the various solid and fluid components of the fracturing material.

It has always been possible to use two or more tracers with different half-lives, and to make multiple logging passes over a period of days or weeks so that different decay rates at different locations can be used to establish where each tracer was deposited. However, the development of gamma ray spectroscopic devices has made it possible to obtain the desired information in a single pass of the logging tool through the well bore by observing the specific gamma ray signatures of each different tracer. These tools measure the energies of the gamma rays which are emitted by radioactive tracers placed in the well and the surrounding formations and a multi-tracer survey log is obtained by deconvolving the gamma ray spectral data into contributions from each individual isotope as a function of depth.

When combinations of radioactive tracers are used in a well operation, care must be taken in selection of the tracers to facilitate the deconvolution of the recorded spectra for ascertaining the energy contributions of the individual tracers.

SUMMARY OF THE INVENTION

This invention is concerned with the optimal use of radioactive isotopes in well logging operations wherein multiple radioactive isotopes are employed. In well operations wherein hydraulic fracturing material is injected from a steel-cased well bore into the surrounding earth formation, one or more relatively low energy gamma ray emitting radioisotopes are selected for tagging the liquids phase of the fracturing material and one or more relatively high energy gamma ray emitting radioisotopes are selected for tagging the solids phase. The relative amount of low energy radioisotope material inside the well bore relative to the amount thereof which is outside the casing is then determined. This is done in order to minimize the interfering effects of the borehole tracers in determining concentrations of the high energy tracers in the formations. The procedure includes detecting the intensity of gamma radiation from the tracers distributed in the borehole and the surrounding earth formations by a gamma ray detector positioned in the borehole in proximity to the zones of injection and obtaining data representative of said radiation intensity. The detected gamma ray intensity data is then separated into an observed energy spectrum from which is obtained observed energy spectrum count rates of gamma radiation in an energy region associated with gamma radiation emitted by the relatively low energy tracer in at least two relatively low energy ranges, a first of which is highly sensitive to photoelectric attenuation by iron in the well casing and a second of which is a higher energy range which is primarily sensitive to Compton scattered gamma rays and much less sensitive to photoelectric absorption by iron.

These count rates are then combined to obtain an observed photoelectric ratio of the low energy tracer. Count rates of radiation are then obtained in all the energy ranges associated with gamma radiation emitted by the low energy tracer to obtain the total elemental concentration of the low energy tracer in the borehole and the formations. The relative signal from the low energy tracer in the borehole versus the signal from said low energy tracer outside the casing is then determined from the relation:

$$Tr(Bor) = Tr(Tot) \cdot \frac{[Ph\ Tr(For) - Ph\ Tr(Obs)]}{[Ph\ Tr(For) - Ph\ Tr(Bor)]}$$

where
- Tr(Tot) is the total observed signal from the low energy tracer,
- Tr(Bor) is the portion of said low energy tracer spectrum signal which occurs in the borehole,
- Ph Tr(Obs) is the observed photoelectric ratio of the low energy tracer,
- Ph Tr(Bor) is the low energy photoelectric ratio calibrated for the tracer in the borehole, and
- Ph Tr(For) is the low energy photoelectric ratio calibrated for the tracer in the formation whereby an estimation may be made of a window count rate of said low energy tracer in the borehole based on the value of Tr(Bor) determined from said relation and subtracted from the total observed window count rates whereby the concentrate of tracers in the formation can be more accurately determined.

BRIEF DESCRIPTION OF THE DRAWINGS

In the accompanying drawing which form part of the specification and are to read in conjunction therewith.

DETAILED DESCRIPTION OF THE PREFERRED EMBODIMENTS

Figure 1:
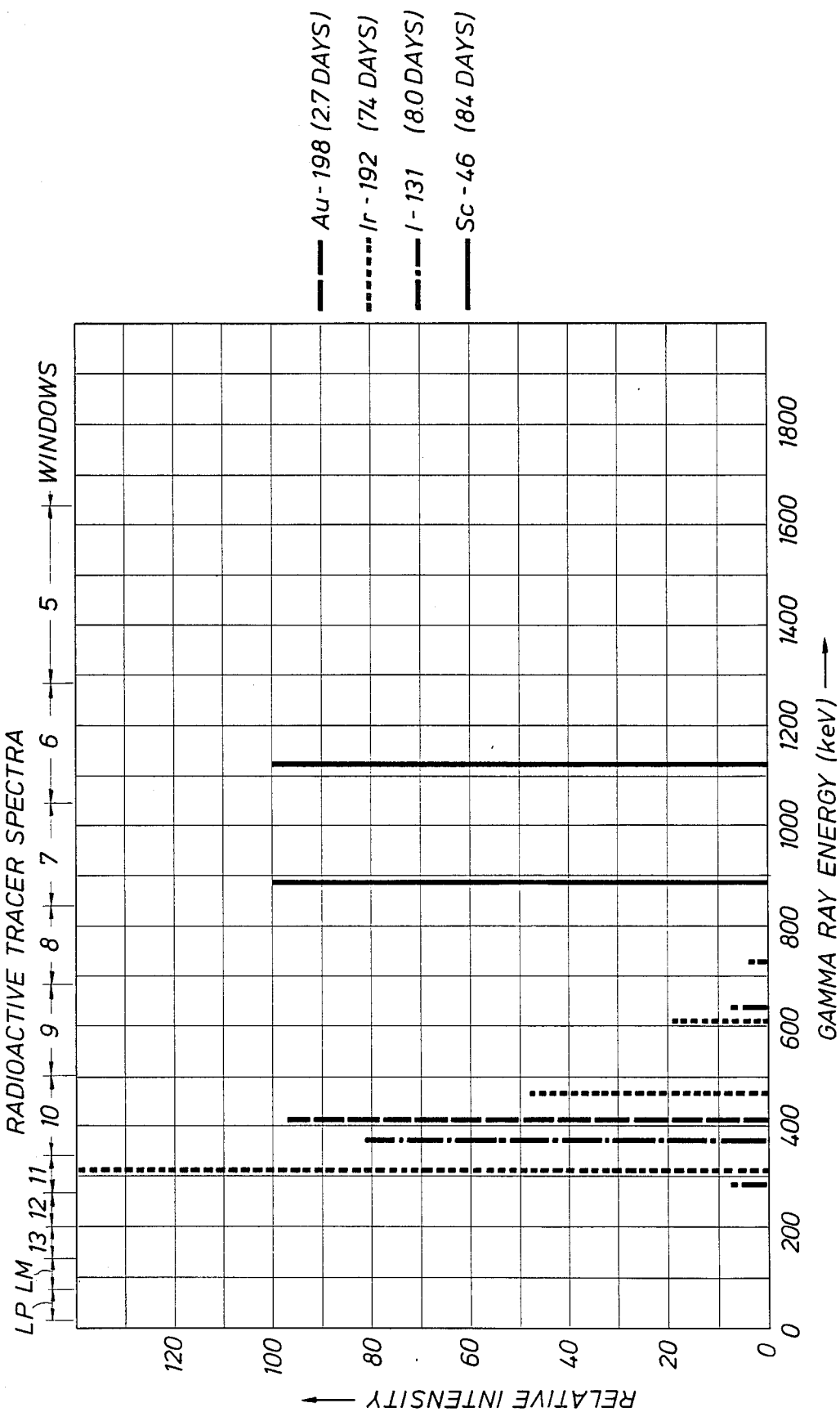
FIG. 1 is a graphical representation of the gamma ray energies and relative intensities of four representative radioactive isotopes.

It has been observed in fracturing operations that part of the liquid phase of the fracturing materials return to the borehole following a fracture. If the liquid phase has been tagged with radioactive tracer then the radioactive tracer with which it is tagged will also be found in the borehole.

Table 1 below lists lithology window count rates and ratios from several radioactive isotopes within three different annuli in laboratory test formations. In the table, window LP has an energy range of 22-83 Kev and window LM has an energy range of 83-137 Kev. As used herein, the term "window" refers to a preselected range of gamma ray energies.

TABLE 1

Lithology Window Count Rates and Ratios from several radioactive isotopes

| Window Element | Formation (P Annulus) | | | Cement (1 Annulus) | | | Casing (C Annulus) | | |
|---|---|---|---|---|---|---|---|---|---|
| | LM (cps) | LP (cps) | $R_p$=LM/LP | LM (cps) | LP (cps) | $R_F$=LM/LP | LM (cps) | LP (cps) | $R_p$=LM/LP |
| K-40 | 31 | 14.6 | 2.12 | 11 | 5.4 | 2.04 | 15 | 11.0 | 1.36 |
| I-131 | 113 | 46.3 | 2.44 | 74 | 32.2 | 2.30 | 132 | 76.1 | 1.73 |
| Au-198 | 439 | 188.2 | 2.33 | 447 | 201.6 | 2.22 | 862 | 520.2 | 1.66 |
| Sc-46 | 229 | 107.5 | 2.13 | 89 | 43.6 | 2.04 | 103 | 55.8 | 1.84 |
| Ir-192 | 209 | 86.2 | 2.42 | 131 | 55.1 | 2.38 | 214 | 135.3 | 1.58 |
| Ag-110 | 1323 | 607.0 | 2.18 | 434 | 208.9 | 2.08 | 410 | 228.2 | 1.80 |

It is to be noted from Table 1, that the presence of the isotopes inside the casing can be reliably separated from the same isotopes (Sc, Ag) outside the casing when the photoelectric signals from inside the casing are compared with those from outside the casing. For each of the isotopes the comparison ratios of count rates in the given windows, LM and LP, for isotopes inside the casing are all less than 2.0 whereas ratios of count rates in the same windows for isotopes outside the casing are all greater than 2.0.

Also, with respect to spectral signature the downscatter effects are more significantly exhibited for the lower energy radioisotopes (Au-198, Ir-192 or I-131) than for the higher energy rays of Sc-46 or Ag-110 where downscatter effects are less pronounced. Accordingly, it will be advantageous to use one of the lower energy isotopes for tagging the liquid whereby its location as to whether it is inside or outside the casing, or both, can be readily ascertained.

As a further aid in the deconvolution process, care should be taken in the selection of a combination of radioisotopes to choose isotopes where the gamma ray energy lines of one isotope are well isolated from those of the other. Table 2 below lists the gamma ray energies and properties of several of the radioactive isotopes used in tracer applications which should be considered in making a selection. In the table, intensity values give the fraction of nuclear decays which result in gamma ray emission. The energy values marked with an asterisk indicate a weighted composite of multiple gamma rays which cannot be resolved by NaI(TL) detectors.

TABLE 2

| TRACER | ISOTOPE | HALF-LIFE | GAMMA-RAY ENERGY* (keV) | INTENSITY |
|---|---|---|---|---|
| Scandium-46 | $46_{Sc}$ | 83.8 days | 889 | 1.00 |
| | | | 1121 | 1.00 |
| Iron-59 | $59_{Fe}$ | 44.6 days | 1099 | 0.57 |
| | | | 1292 | 0.43 |
| Cobalt-60 | $60_{Co}$ | 5.27 years | 1173 | 1.00 |
| | | | 1332 | 1.00 |
| Zinc-65 | $65_{Zn}$ | 244 days | 1116 | 0.51 |
| Silver-110m | $119m_{Ag}$ | 250 days | 447 | 0.04 |
| | | | 666* | 1.32 |
| | | | 773* | 0.34 |
| | | | 885 | 0.73 |
| | | | 937 | 0.34 |
| | | | 1384 | 0.24 |
| | | | 1502* | 0.18 |
| Iodine-131 | $131_I$ | 8.04 days | 284 | 0.06 |
| | | | 364 | 0.81 |
| | | | 637 | 0.07 |
| | | | 723 | 0.02 |
| Lanthanum-140 | $140_{La}$ | 40.2 hours | 329 | 0.21 |
| | | | 484* | 0.48 |
| | | | 751 | 0.04 |
| | | | 826* | 0.29 |
| | | | 925* | 0.11 |
| | | | 1596 | 0.95 |
| | | | 2522 | 0.03 |
| Iridium-192 | $192_{Ir}$ | 74.0 days | 311* | 1.42 |
| | | | 468* | 0.48 |
| | | | 603* | 0.18 |
| Gold-198 | $198_{Au}$ | 2.70 days | 412 | 0.96 |
| | | | 676 | 0.01 |

FIG. 1 shows the location of energy spectral lines for four of the isotopes (Au, Ir, I, Sc) relative to each other and also with respect to the energy windows from which a selection is to be made for monitoring.

If a low energy isotope such as Au-198 is present in the borehole and/or the formation and other tracers are not in the borehole, the choice of window combinations which exclude the low energy windows where the Au Compton scatter signature occurs will be almost totally independent of where the Au is located, be it in the borehole or the formation. Also, any uncertainty in the shape of the Au spectrum will not affect the calculated elemental concentrations as may be determined by using a weighted-least-squares fitting algorithm, such as described in U.S. Pat. No. 3,739,171. Accordingly, since the lower energy isotopes are the choice for tagging the liquid, the higher energy radioisotopes are to be preferred for tagging the solids of the hydraulic fracturing materials.

An additional reason for using the high energy isotopes to tag the solid phase of the fracturing materials is due to the increased depth of investigation relative to the low energy isotopes since higher energy gamma rays penetrate more deeply within the formation. Since the distance from the well bore at which it is possible to determine the distributions of radioactive tracers in fractured formations is usually important, the solid portion should be tagged with a high energy tracer and the liquid portion with a low energy tracer. Normally, the solid materials will tend to remain as proppant within the perforated intervals while the liquid will preferentially migrate up and down the borehole region outside the zone of injection.

In the processing of energy spectrum data, it is important to eliminate the interfering effects of tracers present in the borehole fluid. In this respect, the use of low energy tracers tagged to the liquid of the hydraulic fracturing material will significantly simplify the removal of the energy spectrum contribution of the borehole tracer from the total detected energy spectrum.

In the cased hole situations, photoelectric absorption is the most important mode of gamma ray attenuation for energies less than about 100 Kev. This attenuation process is dominated by the particular element with the highest atomic number Z located between the source of tracer gamma rays and the detector in the logging tool. For tracer operations utilizing a logging tool wherein the radiation detector is housed within a tool case of relatively low atomic number material, the iron in the well casing is by far the highest atomic number Z of any significant downhole constituent. Thus, the low energy portion of an observed tracer spectrum will be strongly influenced by whether or not the tracer gamma rays had to pass through the casing before reaching the detector.

Figure 2:
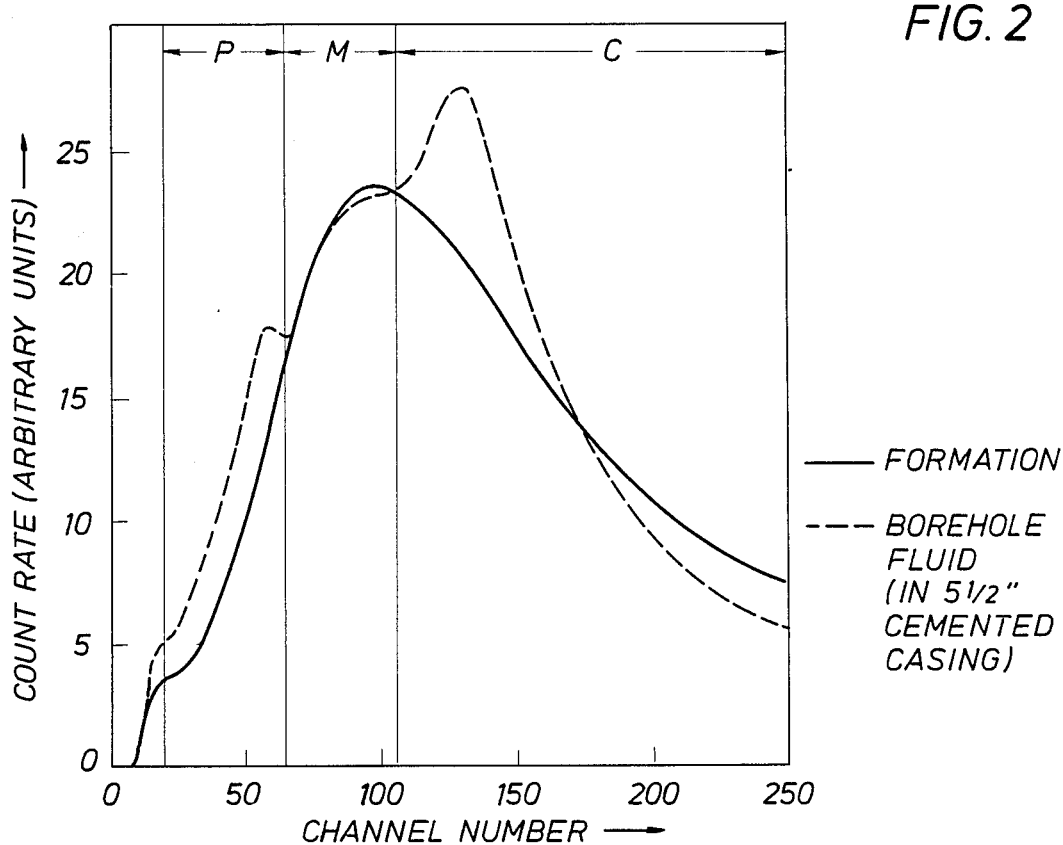
FIG. 2 is a graphical representation of overlaid formation and borehole spectra for Au-198, illustrating the relative effects of photoelectric absorption in the borehole fluid versus the formation.
Figure 3:
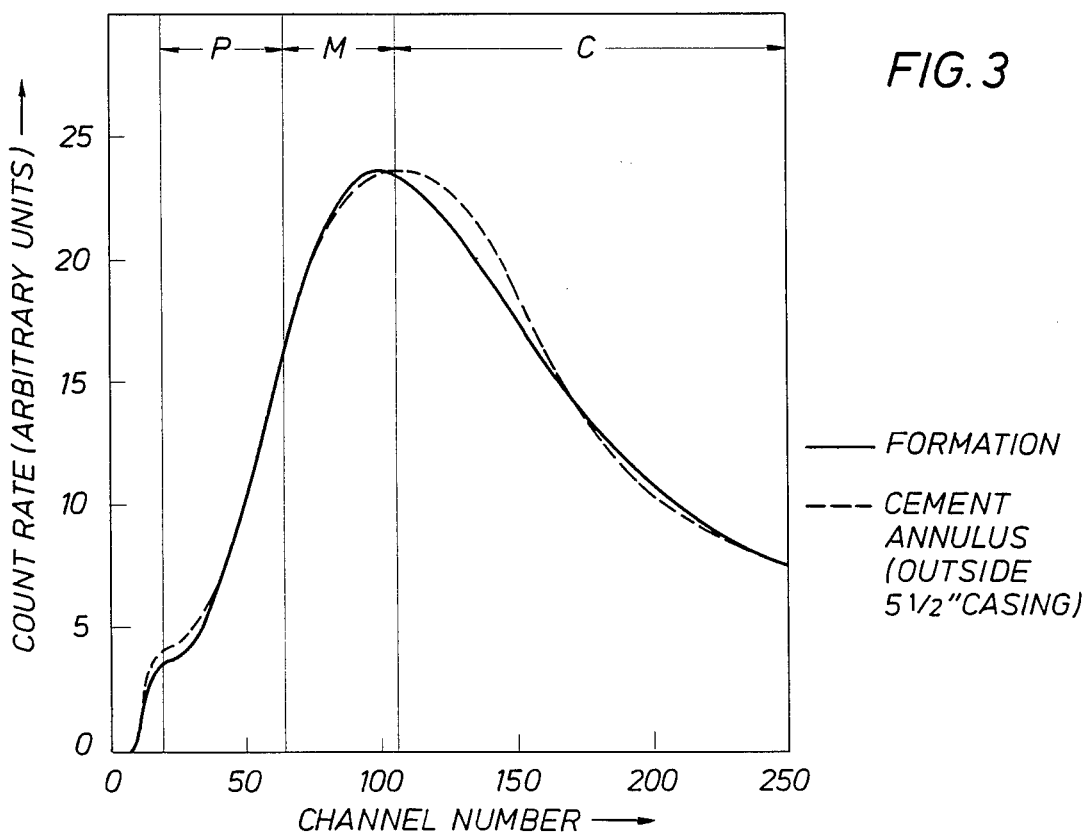
FIG. 3 is a graphical illustration of low energy spectra overlaid to show the minimal spectral differences caused by photoelectric absorption of Au-198 gamma rays originating in the cement annulus versus the formation surrounding a well casing.

The low energy spectra (0–350 Kev) shown in FIG. 2 illustrate the principles underlying the photoelectric measurement. The spectra overlaid in FIG. 2 show the difference in photoelectric absorption from Au-198 gamma rays originating in the formation outside cemented 5½″ casing relative to those coming from inside the casing. The spectra, as illustrated are divided into three energy ranges. The lowest range, P, is sensitive to photoelectric absorption differences caused by the casing. The mid-energy range, M, is a region for which the photoelectric absorption and the Compton downscattering effects are of nearly the same importance. The upper range, C, is that for which Compton downscattering is significant and photoelectric absorption is negligible. A ratio, $R_p$, of gamma ray count rates in window M to those in window P is clearly photoelectrically sensitive to the fraction of tracer inside the casing and yet not markedly affected by Compton scattering effects.

Since a tracer in the borehole fluid would not have to penetrate the iron casing in the wellbore to reach the detector, the observed count rates would show only minimal photoelectric absorption effects relative to count rates caused by any tracer originating outside the casing. Accordingly, if two low energy ranges of the tracer spectrum are chosen—one range "M" which is more sensitive to Compton scattered radiation, and a range "P", a lower energy window which is sensitive primarily to photoelectric absorption in iron—the ratio $R_p$ of the count rate in window M to the count rate in window P will be a sensitive indicator of whether casing is present between the source and detector and accordingly whether the tracer is inside or outside the casing. A method utilizing the ratio $R_p$ for obtaining an indication as to whether tracer is present in the borehole only or also in the formation is described in applicant's co-pending U.S. patent application, Ser. No. 211,521, filed June 24, 1988, which is incorporated herein by reference.

By the method of this invention, photoelectric signals and photoelectric ratios are used for determining the relative amount of a low energy tracer in the borehole versus the amount of the low energy tracer which is outside the casing. This information is then used in the processing of energy spectrum data to remove the contribution of the borehole tracer and its interfering effects from the total detected energy spectrum.

As an example, where Au-198 is selected as a low energy radioisotope for tagging the liquid phase of hydraulic fracturing materials, the relative amount of Au in the borehole versus the amount of Au outside the casing can be determined from a relation as follows:

$$\text{Au (Bor)} = \text{Au (Tot)} \cdot \frac{[Ph\text{Au(For)} - Ph\text{ Au(Obs)}]}{[Ph\text{Au(For)} - Ph\text{ Au(Bor)}]} \quad (1)$$

where Au(Tot) is the total observed gold concentration and Au(Bor) is the portion which occurs in the borehole. The photoelectric ratios PhAu(Obs), PhAu(Bor) and PhAu(For) are the low energy photoelectric ratios observed and calibrated for tracer in the borehole and tracer in the formation, respectively—the photoelectric ratio being the comparison ratio of count rates in a window M to the count rates in a window P.

By use of Table 1, equation (1) can be written:

$$\text{Au (Bor)} = \text{Au (Tot)} \cdot \frac{[2.33 - Ph\text{ Au(Obs)}]}{[2.33 - 1.66]} \quad (2)$$

The ratio PhAu(Obs) can be obtained from the count rates of gamma radiation as observed by the detector in the windows M and P. Au(Tot) is the total observed gold concentration as may be determined by using a weighted-last-squares algorithm. With all the terms on the right side of equation (2) established, the value of Au(Bor) can then be determined.

The window count rates in the borehole can then be estimated from the value of Au(Bor) and subtracted from the total window count rates observed so that elemental concentrations in the formation can be determined more accurately. The correction due to Au(Bor) could be performed dynamically as a function of depth or an average constant value could be used.

As a further enhancement of the processing of energy spectrum data, the technique described above could be used in an interval of the well bore located far above the perforations for which Au(Obs)=Au(Bor). This value would then be subtracted from the entire log before further processing was performed.

It is also to be noted from Table 1 that Au, Ir and I all have similar photoelectric ratio magnitudes as well as similar signals. It is therefore possible that a combination of these isotopes in the borehole could be resolved using the photoelectric ratio technique and the following procedure:

(1) concentrations of the isotopes present in the liquid would be estimated using casing—only sensitivities with a weighted-least-squares algorithm, and (2) window count rates due only to the borehole component would be subtracted before computing the elemental concentrations due to the formation on the remainder of the log.

Figure 4:
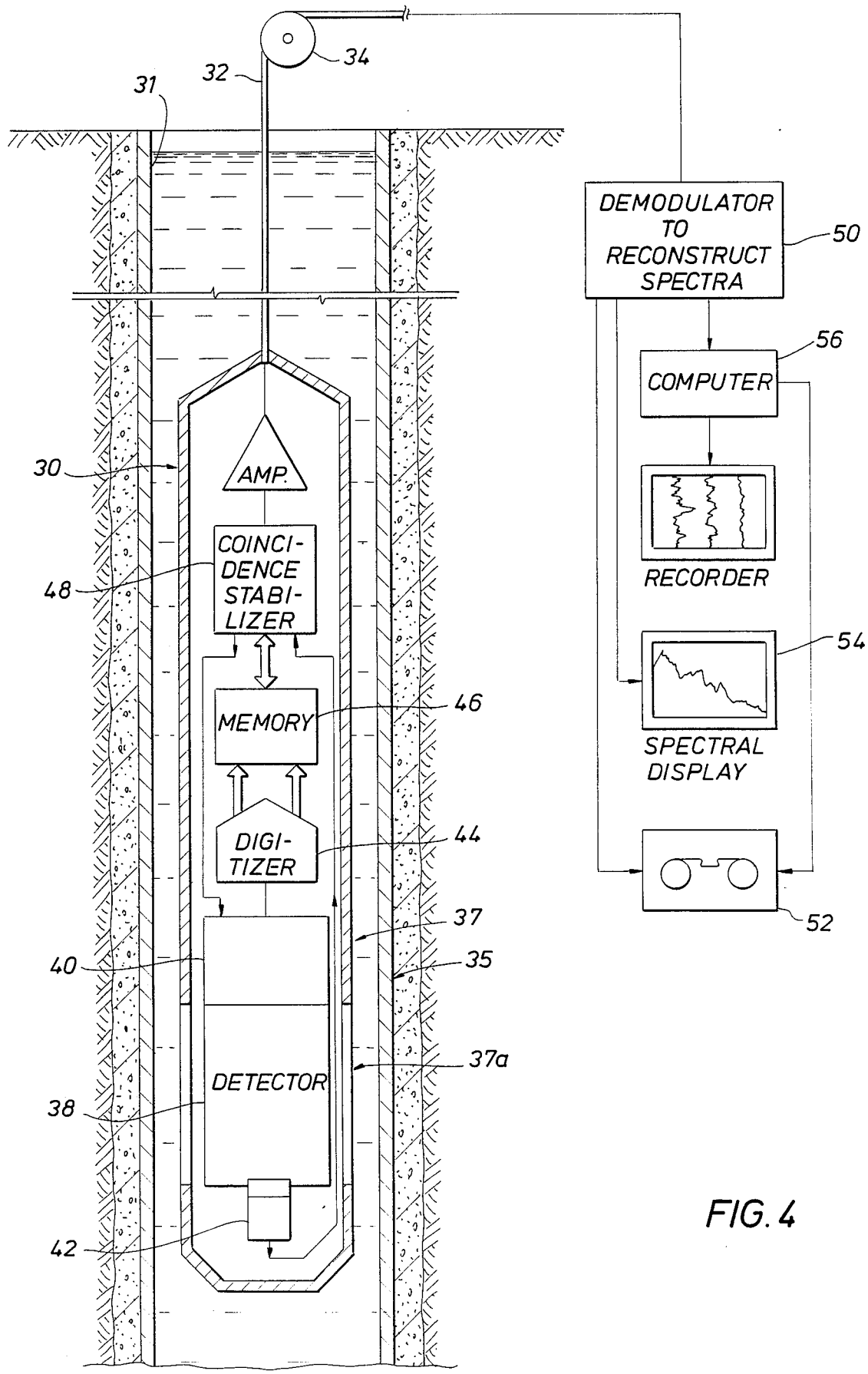
FIG. 4 is a schematic drawing of a well logging system employed in practicing the invention.

A gamma ray logging system which may be used for practicing the invention, and illustrated schematically in FIG. 4, comprises a logging tool 30 suspended in a well borehole 31 from a logging cable 32 supported by a reel 34 on a logging truck or the like. The borehole 31 through earth formations 33 is lined with a steel casing 35 set in place by an annulus of cement. The casing contains a well bore fluid 36. In conventional manner, rotation of the reel 34 provides an indication of tool depth as the cable 32 is moved in or out of the borehole. The tool 30 is provided with a steel housing 37 having a section 37a which surrounds the radiation detector 38. The section 37a is constructed from a material having a low atomic number (Z) and a low density to facilitate observation and measurement of photoelectric absorption of low energy gamma rays. Incident gamma rays whether from natural radiation or from tracers are detected in a large NaI (Tl) scintillation detector crystal 38, the scintillations of which are coupled to a photomultiplier 40 for producing electrical pulses of magnitudes proportional to the energies of the impinging gamma rays.

The system gain is maintained within ±0.5% by a coincidence stabilization technique for which purposes the appartus includes in close proximity to detector 38, a smaller crystal 42 containing an embedded $^{241}$Am source. Such a technique is disclosed in U.S. Pat. No. 4,585,939. When $^{241}$Am decays, a 60 Kev gamma ray and a high energy alpha particle are emitted essentially simultaneously. The alpha particles are detected with virtually 100% efficiency in the smaller detector, whereas most of the 60 Kev gamma rays escape, although approximately 20% of these gamma rays are detected in the large NaI (sodium iodide) detector. Since the gamma rays from the stabilizer are in coincidence with the alpha particles, they can be isolated from all other gamma rays detected in the large crystal 38 with better than 99% efficiency whereby the coincidence spectrum will contain only 60 Kev stabilizer gamma rays and is unaffected by the distribution of external gamma rays. Of course, other gain stabilization techniques, as are commonly used in the art, could alternatively be used if desired.

After amplification by photomultiplier 40, coincidence and anti-coincidence data pulses are digitized by an anlog-to-digital converter 44, accumulated in a data accumulator 46, and sorted by a microprocessor controller 48 which synchronizes transmission of data from the tool 30 to equipment at the surface to be later described. The coincidence (stabilizer) events are converted into a 256 channel spectrum which spans the energy range from 0–350 Kev so as to enable the automatic downhole gain stabilizer feedback circuit to maintain system gain to approximately ±0.5%. The anti-coincidence (formation gamma radiation) events are converted into two spectra, one of which spans the low energy range from 0–350 Kev and the other of which spans the high energy range from 0–3000 Kev. The three spectra are accumulated in the data accumulator 46 and then transmitted along the cable conductors, approximately each 0.25 ft. while logging, to the logging system located at the surface. At the earth surface, the data are demodulated by a demodulator 50 prior to recording in a magnetic tape recorder 52 and display in a spectral display device 54. The high energy and low energy formation gamma ray spectra are also transferred to the computer 56 in which the high energy spectrum is separated into energy windows or regions dependent on the particular tracers used. High energy windows are selected to encompass specific gamma ray energy peaks characteristic of the particular tracer being used between 300 Kev and 3 Mev whereas the low energy windows are selected not to encompass specific energy peaks of the radioactive tracers but rather to include only downscattered radiation, generally between 150–700 Kev. For the low energy spectrum, windows are selected as necessary for providing the photoelectric sensitivity ratios.

It will then be seen that a method of radioactive tracer utilization for well logging operations is described herein which allows significant enhancement of the quality and accuracy of information obtained for determining concentrations of radioactive tracers in earth formation surrounding a well bore. The low energy isotopes lend themselves better to photoelectric discriminating in the borehole, especially when compared with the high energy tracers, and the high energy isotopes provide a deeper radial depth of investigation. Obviously, the choice of low energy gamma ray emitting radioisotopes for tagging the liquids phase of the hydraulic fracturing material may be other than herein described and various combinations are possible. Likewise, Sc-46, Ag-110 and other radioisotopes are suitable candidates for selection of high energy radioisotopes.

It is also to be understood that alternative techniques in performing the various method steps of the invention may be used as are apparent to those skilled in the art, without departing from the scope and spirit of the invention as defined in the appended claims.

What is claimed is:

1. A method for determining the relative amount of a low energy isotope in a steel casing lined well bore relative to the amount of said isotope outside the casing and wherein said isotope is a relatively low energy gamma ray emitting isotope which tags the liquid phase of fracturing material which has been hydraulically injected from the well bore into the surrounding earth formations and has migrated into the borehole, said method comprising the steps of:

(1) detecting the intensity of gamma radiation from the tracer distributed in the borehole and the surrounding earth formations by a gamma ray detector positioned in said borehole in proximity to the formation interval of interest and obtaining data representative of said radiation intensity;

(2) separating the gamma ray intensity data into an observed energy spectrum of detected gamma rays;

(3) obtaining from said observed energy spectrum count rates of gamma radiation in an energy region associated with gamma radiation emitted by said relatively low energy tracer in at least two relatively low energy ranges, a first of which is highly sensitive to photoelectric attenuation by iron in the well casing and a second of which is a higher energy range which is primarily sensitive to Compton scattered gamma rays and much less sensitive to photoelectric absorption by iron;

(4) combining said count rates to obtain an observed photoelectric ratio of count rates in said second energy range to count rates in said first energy range;

(5) obtaining count rates of radiation in all the energy regions associated with gamma radiation emitted by said low energy tracer and processing the count rates to obtain the total elemental concentration of said low energy tracer in the borehole and the formations; and (6) determining the amount of the low energy tracer in the borehole relative to the amount of said low energy tracer outside the casing from the observed photoelectric ratio of low energy tracer obtained in step (4), the total observed concentration of the low energy tracer obtained in step (5), and low energy photoelectric ratios calibrated for the tracer in the borehole and in the formation, respectively.

2. The method as recited in claim 1 wherein the amount of the low energy tracer in the borehole relative to the amount of said low energy tracer outside the casing is determined from the relation:

$$Tr(Bor) = Tr(Tot) \cdot \frac{[Ph\ Tr(For) - Ph\ Tr(Obs)]}{[Ph\ Tr(For) - Ph\ Tr(Bor)]}$$

where
Tr(Tot) is the total observed concentration of the low energy tracer,
Tr(Bor) is the portion of said low energy tracer which occurs in the borehole,
Ph Tr(Obs) is the observed photoelectric ratio of the low energy tracer,
Ph Tr(Bor) is the low energy photoelectric ratio calibrated for the tracer in the borehole, and
Ph Tr(For) is the low energy photoelectric ratio calibrated for the tracer in the formation.

3. The method recited in claim 1 wherein said low energy gamma ray emitting isotope is Au-198.

4. A method as recited in claim 1 wherein said low energy isotope constitutes a combination of relatively low energy gamma ray emitting radioisotopes.

5. The method recited in claim 1 wherein said low energy gamma ray emitting isotope is Ir-192.

6. The method recited in claim 1 wherein said low energy gamma ray emitting isotope is I-131.

7. In a method for determining the elemental concentrations of radioactive isotope tracers in the vicinity of a well bore wherein said tracers are included in a formation fracturing material which has been hydraulically injected from a fluid containing steel cased well bore into surrounding earth formations and the liquid phase of the fracturing material is tagged with relatively low energy gamma ray emitting radioisotope material and the solids phase of the fracturing material is tagged with one or more relatively high energy gamma ray emitting radioisotopes, said method comprising the steps of:

(1) detecting the intensity of gamma radiation from the tracers distributed in the borehole and the surrounding earth formations by a gamma ray detector positioned in said borehole in proximity to the zones of injection and obtaining data representative of said radiation intensity;

(2) separating the gamma ray intensity data into an observed energy spectrum of detected gamma rays;

(3) obtaining from said observed energy spectrum count rates of gamma radiation in an energy region associated with gamma radiation emitted by said relatively low energy tracer in at least two relatively low energy ranges, a first of which is highly sensitive to photoelectric attenuation by iron in the well casing and a second of which is a higher energy range which is primarily sensitive to Compton scattered gamma rays and much less sensitive to photoelectric absorption by iron;

(4) combining said count rates to obtain an observed photoelectric ratio of count rates in said second energy range to count rates in said first energy range;

(5) obtaining count rates of radiation in all the energy regions associated with gamma radiation emitted by said low energy tracer and processing the count rates to obtain the total elemental concentration of said low energy tracer in the borehole and the formations; and (6) determining the amount of the low energy tracer in the borehole relative to the amount of said low energy tracer outside the casing from the relation:

$$Tr(Bor) = Tr(Tot) \cdot \frac{[Ph\ Tr(For) - Ph\ Tr(Obs)]}{[Ph\ Tr(For) - Ph\ Tr(Bor)]}$$

where
Tr(Tot) is the total observed concentration of the low energy tracer as obtained in step (5),
Tr(Bor) is the portion of said low energy tracer which occurs in the borehole,
Ph Tr(Obs) is the observed photoelectric ratio of the low energy tracer as obtained in step (4),
Ph Tr(Bor) is the low energy photoelectric ratio calibrated for the tracer in the borehole, and
Ph Tr(For) is the low energy photoelectric ratio calibrated for the tracer in the formation whereby an estimation may be made of a window count rate of said low energy tracer in the borehole based on the value of Tr(Bor) determined from said relation and subtracted from the total observed window count rates to obtain a more accurate determination of elemental tracer concentration.

* * * * *